No. 888,764. PATENTED MAY 26, 1908.
G. W. & H. STERKEN.
ATTACHMENT FOR SEED PLANTERS.
APPLICATION FILED AUG. 31, 1907.
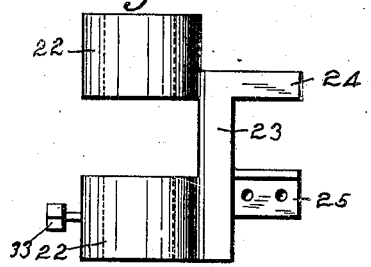
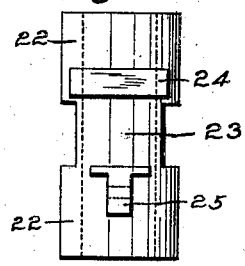
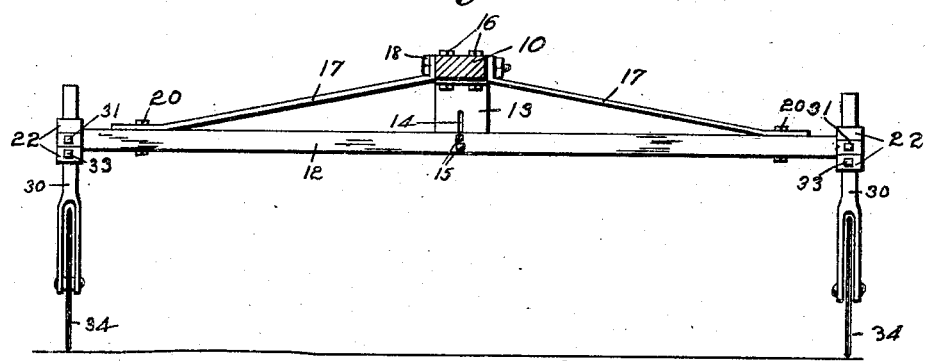
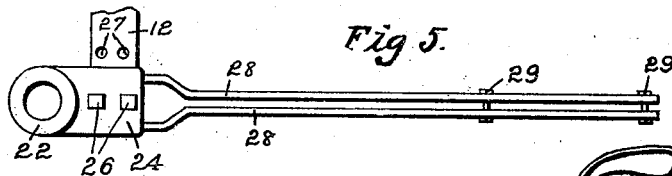
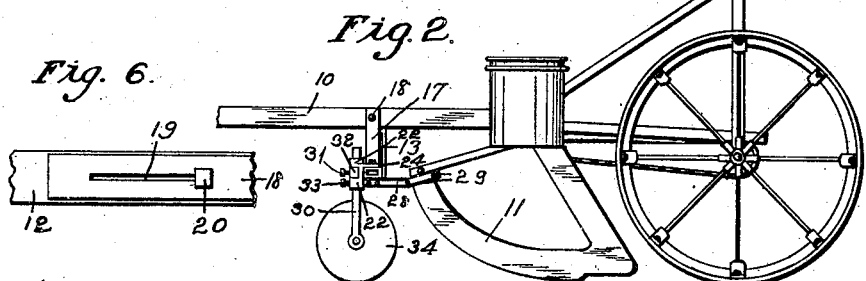
Witnesses.
Inventors
G. W. Sterken and Henry Sterken
by Orwig & Lane attys.

UNITED STATES PATENT OFFICE.

GERRIT W. STERKEN AND HENRY STERKEN, OF ROCK VALLEY, IOWA.

ATTACHMENT FOR SEED-PLANTERS.

No. 888,764.   Specification of Letters Patent.   Patented May 26, 1908.

Application filed August 31, 1907. Serial No. 390,939.

*To all whom it may concern:*

Be it known that we, GERRIT W. STERKEN and HENRY STERKEN, citizens of the United States, residing at Rock Valley, in the county of Sioux and State of Iowa, have invented a certain new and useful Attachment for Seed-Planters, of which the following is a specification.

The object of our invention is to provide a device of simple, durable and inexpensive construction, that may be used in the nature of an attachment to be applied to any ordinary seed planter having two runners or furrow openers, which attachment comprises braces and supports having rolling disk cutters, which are so arranged that they will run in advance of the runners and serve the double function of cutting or severing any stalks or other similar material in the path of the runners, to thereby prevent the runners from being thrown out of the ground by such stalks or other material, and at the same time to serve as guide for the runners to prevent lateral or swinging movement thereof, and thus tend to form straighter rows than is possible without the use of such devices.

Our invention consists in the construction, arrangement and combination of the various parts of the device, and its detachably adjustable connection with a planter, whereby the objects contemplated are attained, as hereinafter more fully set forth, pointed out in our claims, and illustrated in the accompanying drawings, in which—

Figure 1 shows a front elevation of a device embodying our invention, applied to the tongue of a planter, said tongue being shown in section. Fig. 2 shows a side elevation of a planter having our improved device attached thereto. Fig. 3 shows a side elevation of one of the brackets for supporting the disk shaft. Fig. 4 shows a rear elevation of same. Fig. 5 shows a top or plan view of one of said brackets connected to a supporting cross piece, and having clamping bars for attaching it to a runner, and Fig. 6 shows a detail plan view illustrating the connection between the cross piece of the attachment and the supporting brace bars thereof.

Referring to the accompanying drawings, we have used the reference numeral 10 to indicate the tongue of a planter, and 11 to indicate the runners thereof. These are the only parts of the planter that need not be considered in connection with our improvement, and they of themselves form no part of our present invention.

Our attachment comprises a supporting piece 12, of substantially the same width as that between two runners of a planter. Connected with the central portion of the cross piece 12 is a supporting plate 13 having a slot 14 therein. This plate is adjustably connected with the cross piece by means of bolts 15 passed through the cross piece and through said plate. The upper portion of the plate is connected by means of bolts 16 with the tongue 10. In this way, the cross piece may be adjustably supported relative to the tongue. For bracing the cross pieces on the tongue, we have provided two brace bars 17 connected at their inner portions by means of a bolt 18 with the tongue, and extended outwardly and downwardly, and provided with slots 19 at their ends to receive the bolts 20 which are extended through the cross piece. In this way, the brace bars may be firmly secured in position, either when the cross piece is at the bottom of the plate 13, or in any other position of its adjustment.

Attached to each end of the cross piece is a bracket composed of two cylindrical parts 22 spaced apart and connected at their rear ends by the part 23 having a rearwardly projecting plate 24 at its top, and a rearwardly projecting support 25 substantially T shaped in cross section near its bottom. The plate 24 is designed to rest upon the top of the cross piece 12, and is detachably and adjustably connected therewith by means of two bolts 26. The adjustment may be made by removing the bolts 26 from the position shown in Fig. 5, and sliding the bracket inwardly on the cross piece and inserting the bolts in the openings 27. Attached to the support 25 are two bars 28 extended rearwardly, and then upwardly, and designed to admit between them the forward portion of the runner 11. Bolts 29 are extended through these bars on opposite sides of the runner 11 to firmly clamp the bars to the runner. In this way our improved attachment is made to brace and connect together the tongue and the forward ends of the runners. Extended vertically through the parts 22 of the brackets, are the disk shafts 30, which are adjustably held in place by means of set screws 31 passed through the collars 32, which collars are placed between the parts 22. In order to hold the shafts 30 against lateral movement, we have provided set screws 33 extended through the lower one of the parts 22, to engage the shaft 30. A disk shaped cutter 34 is placed at the lower end of each of the shafts 30, and are held directly in line with the runners 11.

In practical use, and assuming the planter to be provided with our improvement, the disks are first set so that they will run to the desired depth and stand straight in front of the runners, then as the planter is advanced over the field, the disks will cut through stalks or other obstructions so that the runners will follow in the cuts made by the disks and they will not be elevated out of the ground by obstructions in the field. In this way, planting of seeds may be made at a substantially uniform depth. Furthermore, by having the disks placed in advance of the runners, they will serve to prevent lateral movement of the disk as it is advanced across the field. In this way planting may be done in comparatively straight rows.

In attaching our device to a planter, the cross piece may first be connected with the tongue, and may be placed at any desired distance from the tongue, or any desired elevation from the ground, so that the device may be applied to planters of different sizes and shapes. Then also the cutting disks may be adjustable up and down to enter the ground to the desired depth if desired, and furthermore, if desired, the cutting disks may be set at slight angles relative to the line of advance of the machine, to cut a furrow, and thus aid the runners in entering the ground.

Having thus described our invention, what we claim and desire to secure by Letters Patent of the United States, therefor, is—

1. In a device of the class described, the combination of a cross piece designed for connection with a planter frame, a pair of brace bars fixed to each end of the cross piece, and designed to be connected to the forward ends of runners, or furrow openers, and a bracket fixed to each end of the cross piece, a cutter disk for each bracket and a shaft for each cutter disk extended upwardly through the bracket and detachably and adjustably connected therewith.

2. In a device of the class described, the combination of a cross piece, a plate adjustably fixed to the cross piece, brace bars adjustably fixed at their ends to the cross piece, said plate and brace bars designed to be connected to the tongue of a seed planter, a bracket adjustably fixed to each end of the cross piece and comprising two cylindrical members spaced apart, a rearwardly projecting plate designed to be secured to the top of the cross piece, and a rearwardly projecting support below said plate, a collar inserted between said cylindrical members, a disk for each of said brackets, a shaft for each disk passed through the cylindrical members and the collar, set screws passed through the collar to engage the shaft, and brace bars fixed to said rearwardly projecting support, and having their rear ends designed to overlap the opposite sides of the runner, and bolts for securing said bars to a runner.

Des Moines, Iowa, Aug. 12, 1907.

GERRIT W. STERKEN.
HENRY STERKEN.

Witnesses:
C. A. WALHOF,
J. A. HINZENGA.